US009875345B2

(12) United States Patent
Robert et al.

(10) Patent No.: US 9,875,345 B2
(45) Date of Patent: Jan. 23, 2018

(54) METHOD FOR WATERMARKING A CONTENT

(71) Applicant: CONTENTARMOR, Rennes (FR)

(72) Inventors: Antoine Robert, Mezieres sur Couesnon (FR); Gwenael Doerr, Rennes (FR); Omar Julian Alvarez Gomez, Rennes (FR)

(73) Assignee: CONTENTARMOR, Rennes (FR)

( * ) Notice: Subject to any disclaimer, the term of this patent is extended or adjusted under 35 U.S.C. 154(b) by 0 days.

(21) Appl. No.: 14/472,479

(22) Filed: Aug. 29, 2014

(65) Prior Publication Data
US 2015/0063567 A1  Mar. 5, 2015

(30) Foreign Application Priority Data

Aug. 30, 2013 (EP) .................................... 13306190

(51) Int. Cl.
*G06F 21/62* (2013.01)
*G06F 21/16* (2013.01)
(Continued)

(52) U.S. Cl.
CPC ............ *G06F 21/16* (2013.01); *G06T 1/0021* (2013.01); *H04N 1/32144* (2013.01);
(Continued)

(58) Field of Classification Search
CPC ......... H04N 1/32144; H04N 21/23439; H04N 21/2541; H04N 21/8358; H04N 21/8456;
(Continued)

(56) References Cited

U.S. PATENT DOCUMENTS 7,660,429 B2 *  2/2010  Shaked ................... G06T 1/005
                                                    283/113
2003/0185417 A1 * 10/2003  Alattar .................. G06T 1/0064
                                                    382/100

(Continued)

FOREIGN PATENT DOCUMENTS

WO    WO2012130287    10/2012
WO    WO2013079632     6/2013

OTHER PUBLICATIONS

Robert et al, "Adjusting Bit-Stream video watermarking systems to cope with HTTP adaptive streaming transmission", 2014 IEEE International Conference on Acoustic, Speech and Signal Processing, May 4, 2014, pp. 7416-7419.

(Continued)

*Primary Examiner* — Hadi Armouche
*Assistant Examiner* — Sakinah Taylor
(74) *Attorney, Agent, or Firm* — David D. Brush; Westman, Champlin & Koehler, P.A.

(57) ABSTRACT

A method for preparing content for watermarking is disclosed. The content is available in different versions on a server for at least a client and the different versions of the content are subdivided into temporally aligned chunks. For each version of the content, candidate locations for watermarking are obtained. A watermark payload bit insertion rate is determined according to a minimum path. Watermark embedding metadata is generated for each version of the content such that the watermark payload bit insertion rate is the same. A device for implementing the method and a non-transitory program storage device are also disclosed.

3 Claims, 5 Drawing Sheets

(51) Int. Cl.
  *H04N 21/2343* (2011.01)
  *H04N 21/2389* (2011.01)
  *H04N 21/254* (2011.01)
  *H04N 21/8358* (2011.01)
  *H04N 21/845* (2011.01)
  *H04N 1/32* (2006.01)
  *G06T 1/00* (2006.01)

(52) U.S. Cl.
  CPC . *H04N 21/23439* (2013.01); *H04N 21/23892* (2013.01); *H04N 21/2541* (2013.01); *H04N 21/8358* (2013.01); *H04N 21/8456* (2013.01)

(58) Field of Classification Search
  CPC ....... H04N 7/166; G06F 21/16; G06T 1/0028; G06T 2201/0052; H04K 2203/14
  USPC .......................................... 380/205
  See application file for complete search history.

(56) References Cited

U.S. PATENT DOCUMENTS

| | | | |
|---|---|---|---|
| 2004/0022444 A1* | 2/2004 | Rhoads | G06K 9/00577 382/232 |
| 2004/0125952 A1* | 7/2004 | Alattar | G06T 1/0064 380/202 |
| 2006/0251289 A1* | 11/2006 | Williams | G06T 1/0085 382/100 |
| 2007/0177761 A1* | 8/2007 | Levy | G06F 21/10 382/100 |
| 2011/0188700 A1* | 8/2011 | Kim | H04N 5/913 382/100 |
| 2012/0045054 A1 | 2/2012 | Main et al. | |
| 2013/0054972 A1 | 2/2013 | Thorwirth | |
| 2013/0101059 A1* | 4/2013 | Moskowitz | H04N 1/32144 375/259 |
| 2013/0148843 A1 | 6/2013 | Doerr et al. | |
| 2013/0166868 A1 | 6/2013 | Jarnikov et al. | |

OTHER PUBLICATIONS

Mitra et al., "An Optimal Client Buffer Model for Multiplexing HTTP Streams", 2012 IEEE 14th International Workshop on Multimedia Signal Processing, 2012, pp. 283-288.

Zou et al., "H.264/AVC Substitution Watermarking: A CAVLC Example", Proceedings of SPIE Media Forensics and Security, 7254, Jan. 2009, pp. 1-12.

Zou et al: "H.264 Stream Replacement Watermarking with CABAC Encoding", Proceedings of ICME'10, Jul. 2010, pp. 117-121.

Jarnikov et al., "Watermarking for Adaptive Streaming Protocols", Proceedings of Secure Data Management 2011, LNCS 6933, pp. 101-113.

Ozer, "Producing streaming video for multiple screen delivery", Chapter 5, Adaptive Streaming, Doceo Publishing, Apr. 2013, pp. 120-126.

European Search Report and Written Opinion dated Jan. 9, 2014 for corresponding European Application No. 13306190, filed Aug. 30, 2013.

* cited by examiner

Fig 1 : Prior art

METHOD FOR WATERMARKING A CONTENT

This application claims the benefit, under 35 U.S.C. §119 of European Patent Application No. 13306190.3, filed Aug. 30, 2013.

FIELD OF THE INVENTION

The invention relates to watermarking, in particular when a content, such as a video or an audio content, is delivered through HTTP adaptive streaming. More particularly, the invention relates to a method for watermarking a content, wherein the content is available in different versions on a server for at least a client and wherein the different versions of the content are subdivided into temporally aligned chunks. The invention also relates to associated devices implementing the method.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

While only a decade ago, video content was primarily intended to be watched on TV sets, today, numerous devices could be used instead e.g. portable video players, tablets, smart phones, etc. All these devices have different capabilities (screen resolution, CPU power, battery) and are somehow connected to get access to content. As a result, there is a need to serve these devices with tailor-made content while preferably sharing the same hardware distribution infrastructure.

This is essentially the role of adaptive streaming. In a nutshell, the idea is to have several versions of the content available and to serve the target devices depending on their own capabilities and the current network conditions. Among alternate approaches for adaptive streaming, HTTP adaptive streaming (HAS) is currently the approach receiving most interest. The idea is to have a HTTP server which serves alternate segments/chunks of the video depending on the request of the client. In other words, a video content can be seen as a collection of files (either physical or logical) that can be requested by the client who has access to a manifest.

Traitor tracing consists in serving clients with content watermarked with a unique identifier. If a copy is later found on an unauthorized distribution network, it is then possible to identify the misbehaving customer. While there have been a number of algorithms proposed for conventional video, HAS only received marginal interest.

In the domain of watermarking scheme compliant with HAS, the document U.S. 2013/0166868 discloses a server storing several pre-watermarked versions of each chunk and preparing a client-specific manifest file depending on the client user identifier (UID) so that the client gets a copy watermarked with its UID when the video is served. The main shortcoming of this approach is that it induces significant storage overhead on the server side. Moreover, the solution may be tricky to set in place for systems relying on logical files, e.g. Adobe HDS, Microsoft ISS or MPEG DASH. Besides, this solution induces that the server knows the client UID which raises a liability problem, in other words how to ensure that the server provides good playlist to the right client based on its identifier and even more what if the server is "malicious". Finally, another drawback of this solution is that individual chunks cannot carry a non-integer number of payload bits. Indeed if a chunk is anticipated to encode N payload bits, the server should store the associated $2^N$ different pre-watermarked versions of the chunk. This requires N to be an integer number, and a rather small one actually to avoid significant storage overhead. As a result, the watermark embedding rate may be significantly reduced.

In the domain of watermarking schemes, document WO 2013/079632 of the applicant describes a 2-steps bit stream video watermarking system that operates directly in the compressed domain. It is composed of (i) a computationally intensive profiling step that analyzes the bit stream to identify locations that could be possibly modified as well as an alternate value that could be used, and (ii) a blitz fast watermark embedding module that applies this metadata to insert the desired watermark payload. A key aspect of this system is that the two steps can be run at different locations and time, e.g. the preprocessing offline with the metadata stored on the server and the serialization online on the client side. As a result, this solution does not induce any overhead (CPU, storage) on the server side.

Since the video content is now composed of Q different bit streams (1 stream per quality e.g. per bit rate) and that we know how to watermark a single bit stream, a straightforward idea consists in profiling all Q bit streams independently and incorporating in each chunk the corresponding metadata to embed the watermark. Upon reception of HAS video chunks on the client side, the embedding instructions are applied to serialize the chunk with the unique identifier of the client. For forensics investigation, Q detectors are run in parallel (1 detector per forensic metadata i.e. per quality). The watermark information obtained with the quality that yields the highest detection response is then kept for each set of temporally aligned chunks. Finally, the information obtained for all selected chunks is aggregated to recover the hidden watermark payload.

The main issue with this approach is that the embedding rate, in other words, the number of changes performed per second, is highly dependent on the intrinsic properties of the bit stream. As a result, the preprocessing module applied to the Q different bit streams will yield slightly different embedding rates. Since each payload bit 130 is spread over a number of changes in the bit stream, the random switches of HAS are prone to come into the way of the payload modulation strategy as depicted in FIG. 1. Q=4 bit streams 101, 102, 103, 104, associated to Q versions of the video content, are available at the server. Each version subdivided in temporally aligned chunks or segments 100. Each payload bit of the message (e.g. UID) is spread across 5 changes in the bit stream. Each payload bit 110 is represented by 5 elements such as square 111, triangle 112, circle 113 and diamond 114. Each client or viewer receives a collection 121, 122 of chunks 100 corresponding to a random path across the Q versions or qualities in this example. Such random paths are indicated in dashed lines. These random switches intrinsically come into the way of the payload modulation strategy i.e. a payload bit no longer reduces to a series of 5 changes burst as exemplified on the paths corresponding to the collections 121, 122 of chunks. For instance, the path 121 of the first viewer yields 6 changes associated to the first payload bit (square) and only 4 for the second one (triangle). Parallel decoding of the chunks may still be possible but there is no guarantee on the robustness of individual embedded bits. In other words, while this method allows efficient serialization at the client side, it is not compliant with HTTP adaptive streaming for delivering the content.

In summary, known methods for watermarking video either raise the issue of overhead in term of CPU and of data storage on the server side or the issue of the compliance with HTTP adaptive streaming. A method for watermarking video compliant with HTTP adaptive streaming which reduces the overhead (CPU, storage) on the server side is therefore needed.

SUMMARY OF THE INVENTION

The purpose of the invention is to overcome at least one of the disadvantages of prior art by proposing a method for watermarking a content, wherein the content is available in different versions on a server for adaptive streaming delivery.

Indeed, a salient idea of the invention is to introduce an harmonization module that takes in input the watermark metadata of the Q bit streams, each bit stream corresponding to a version of the video content and being split into temporally aligned chunks, to analyse them jointly and derive some HTTP adaptive streaming compliant statistics, also referred to as watermark insertion rate. In a variant, the watermark insertion rate corresponds to the maximum number of changes that should be applied in any chunk of a collection of temporally aligned chunks. In another variant, the watermark insertion rate corresponds to the exact real number of payload bits that should be embedded in any chunk of collection of temporally aligned chunks. Then, the watermark metadata of the Q bit streams are modified according to the watermark insertion rate for instance by skipping some possible changes to achieve an harmonized modulation strategy over the Q bit-streams.

To this end, the invention relates to a method for preparing a content for watermarking, wherein the content is available in different versions on a server for at least a client and wherein the different versions of the content are subdivided into temporally aligned chunks. The method comprises obtaining for each version of the content, candidate locations for watermarking; determining a payload bit watermark insertion rate according to a minimum path, wherein the minimum path comprises, for all sets of temporally aligned chunks, the chunks with the smallest number of candidate locations; and generating watermark embedding metadata for each version of the content such that the watermark payload bit insertion rate is the same.

In a first preferred embodiment, the method comprises determining the watermark payload bit insertion rate by computing a minimum number of candidate locations for each chunk along the minimum path; and generating watermark embedding metadata by discarding candidate locations exceeding the minimum number of candidate locations for each temporally aligned chunk of the set.

In a second preferred embodiment, the method comprises determining watermark payload bit insertion rate by determining payload truncation points, wherein a truncation point is representative of a switch to another bit in the payload along the minimum path and by exporting the truncation points in the others chunks of the set of temporally aligned chunks; and generating watermark embedding metadata by adopting a spreading length per chunk that yields the payload truncation points.

According to a particularly advantageous characteristic of the invention, the method comprises embedding the payload by applying watermark embedding metadata to the content. Thus the method is a method for watermarking a content. In a variant, the embedding is performed by the server. In another variant, the embedding is performed by the client device and the method comprises forwarding, to the client device, the watermark embedding metadata corresponding to the chunks requested by the client. Advantageously theses embodiments reduces the server charge for watermarking a HTTP adaptive streaming content.

In a second aspect, the invention is directed to a computer-readable storage medium storing program instructions computer-executable to perform the disclosed method.

In a third aspect, the invention is directed to a device comprising at least one processor configured to compute the steps of the method for watermarking a content, wherein the content is available in different versions and wherein the different versions of the content are subdivided into temporally aligned chunks. In a first embodiment, the device is adapted for preparing a content for watermarking and comprises:

A profiler configured to obtain, for each version of the content, candidate locations for watermarking;

A pre-formatter configured to determine a watermark payload bit insertion rate according to a minimum path, wherein the minimum path comprises, for all sets of temporally aligned chunks, the chunks with the smallest number of candidate locations;

A formatter configured to generate watermark embedding metadata for each version of the content such that the watermark payload bit insertion rate is the same;

An inserter adapted to insert watermark embedding metadata in each version of the content.

Advantageously in this embodiment, the watermark embedding is latter performed by the client device.

In a second embodiment, the device is adapted for watermarking a content and comprises:

A profiler configured to obtain, for each version of the content, candidate locations for watermarking;

A pre-formatter configured to determine a watermark payload bit insertion rate according to a minimum path, wherein the minimum path comprises, for all sets of temporally aligned chunks, the chunks with the smallest number of candidate locations;

A formatter configured to generate watermark embedding metadata for each version of the content such that the watermark payload bit insertion rate is the same;

An inserter configured to embed a payload by applying watermark embedding metadata to the content.

Advantageously in this embodiment, the watermark embedding is performed at the server side in the watermark pre-processing device.

While not explicitly described, the present embodiments may be employed in any combination or sub-combination. For example, the embedding is performed on a device distinct from the watermark pre-processing device either at the HTTP server or at the client device. Besides, any characteristic or variant described for the method is compatible with a device intended to process the disclosed methods and with a computer-readable storage medium storing program instructions.

BRIEF DESCRIPTION OF THE DRAWINGS

Other characteristics and advantages of the invention will appear through the description of a non-limiting embodiment of the invention, which will be illustrated, with the help of the enclosed drawings.

DETAILED DESCRIPTION OF PREFERRED EMBODIMENTS

The disclosed method is particularly well adapted to any 2-steps bit stream video watermarking technique wherein watermark embedding metadata are derived from the analysis of the compressed bit-stream and wherein the embedding process is advantageously performed by the client by exploiting the previously computed metadata. Although compliant with any watermarking technique, a preferred embodiment is described for such watermark scheme.

Figure 1:
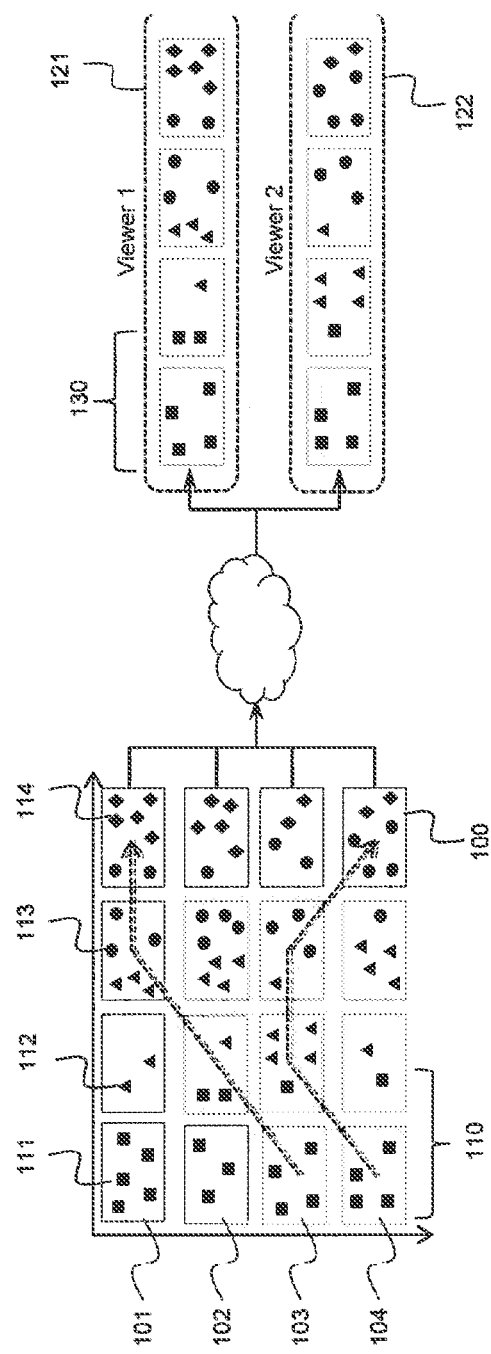
FIG. 1 illustrates the issue raised by HTTP adaptive streaming on the modulation of payload bits according to prior art.
Figure 2:
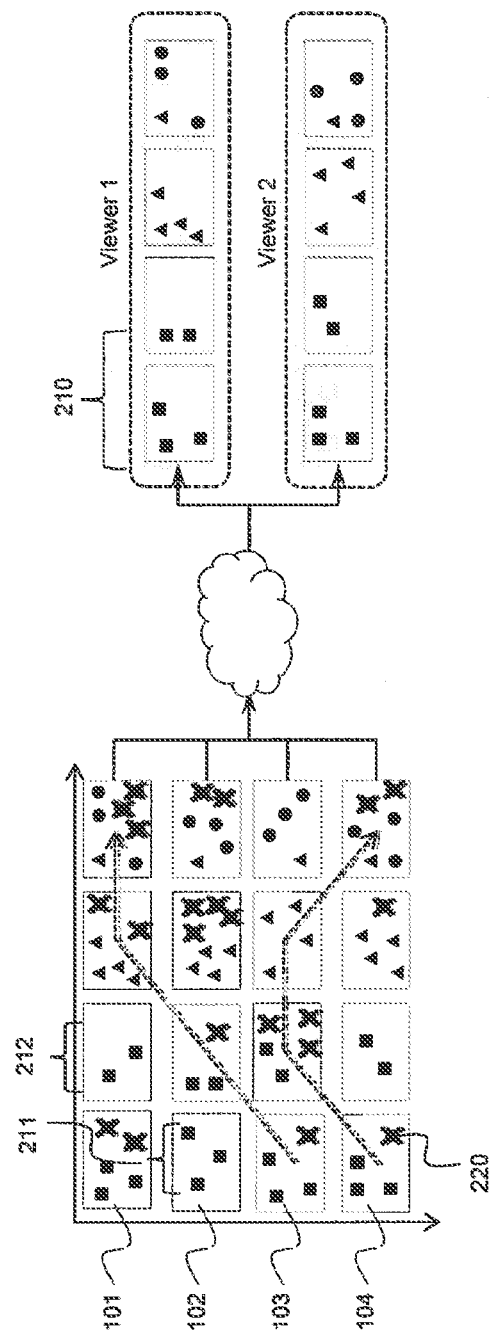
FIG. 2 illustrates the method for harmonizing the modulation of the payload bits across the Q versions according to a first preferred embodiment.

FIG. 2 illustrates the method for harmonizing the modulation of the payload bits across the Q versions according to a first preferred embodiment.

In this first embodiment, for each collection of temporally aligned chunks, the corresponding watermark embedding metadata of the Q versions are inspected jointly to identify the chunk 211, 212 that has the minimum number of embedding changes m. Then, for all chunks in this collection of temporally aligned chunks, the corresponding watermark embedding metadata is updated in order for some embedding changes 220 to be discarded so that any chunk in the set has exactly the same number of embedding changes m. In a variant, the discarded changes are located at the end of the chunks. In another variant, the discarded changes are randomly located within the chunks. For each of the Q version, the remaining metadata is then formatted to incorporate the payload modulation strategy using a fixed spreading length 210 and forwarded to the embedding module so that it can be exploited for latter embedding, either on the server side prior to delivery or on the client side upon reception.

Since the embedding rate is calibrated for each collection of temporally aligned chunks on the chunk that present the smallest number of watermark embedding change, any path across the Q qualities yields exactly the same number of embedding changes and there is no longer any issue of watermark payload modulation misalignment.

Figure 3:
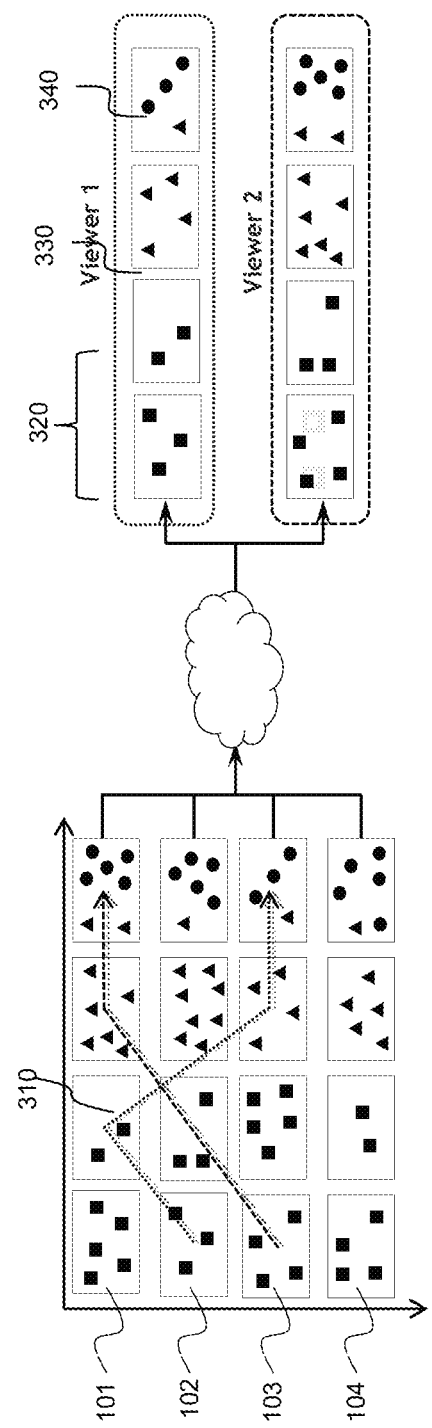
FIG. 3 illustrates the method for harmonizing the modulation of the payload bits across the Q versions according to a second preferred embodiment.

FIG. 3 illustrates the method for harmonizing the modulation of the payload bits across the Q versions according to a second preferred embodiment. In the first embodiment, the payload modulation is calibrated with respect to the minimum path, that is to say the path that would yield the minimum number of embedding changes. Although straightforward, this strategy is suboptimal in the sense that it incurs a loss of embedding rate for chunks with higher capacity.

An alternate idea is to still calibrate the modulation with respect to the minimum path 310 but to make full use of the embedding capacity of other qualities. Thus, a salient idea of the second embodiment is to apply the regular payload modulation strategy using a fixed spreading length along the minimum path to identify the locations of the payload truncation points, which are then exported to the corresponding temporally aligned chunks. In other words, the payload modulation pace is calibrated on the minimum path to guarantee a specified minimum level of robustness but the modulation itself exploits any available extra capacity as soon as the client path deviates from this worst case, by adjusting the spreading length in the chunk accordingly, and thus yields improved robustness.

In this second embodiment, the harmonization module maintains a counter C that is initialized to 0. As in the first embodiment, for each collection of temporally aligned chunks, the corresponding watermark embedding metadata of the Q versions are inspected jointly to identify the chunk that has the minimum number of embedding changes m. The counter C is then incremented m times and, each time it reaches $L_{ref}$, the reference spreading length 320 that is to be used along the minimum path, a payload truncation point 330 is recorded and the counter C is reset to 0. The truncation point is a relative index in [0,1] that indicates to the payload modulation engine the proportion of embedding changes that needs to be consumed before changing to the next bit. These truncation points are then simply exported to the other chunks in the collection of temporally aligned chunks. More specifically, the metadata is formatted so that the relative indices, which indicate when the embedding module should switch to another payload bit, are the same across all chunks. This is somehow equivalent to adjusting the spreading length used in each chunk depending on the number of embedding changes so as to match the modulation pace along the minimum path. For instance, in the $4^{th}$ chunk 340, the minimum path exhibits a payload truncation point at 0.25. For the path of viewer 2, the $4^{th}$ chunk contains 7 embedding changes and the truncation point translates in a payload bit change after ceil(7/4)=2 embedding changes.

Once properly formatted, the metadata is forwarded to the embedding module so that it can be exploited for latter embedding, either on the server side prior to delivery or on the client side upon reception.

Figure 4:
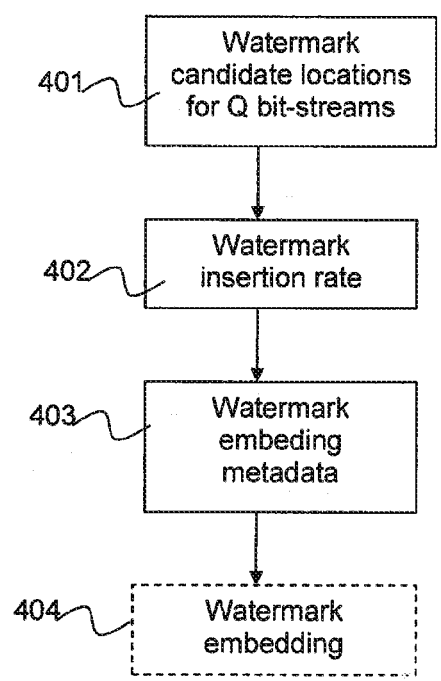
FIG. 4 represents the steps of method for achieving compliance with HTTP adaptive streaming according to a particular embodiment.

FIG. 4 represents the steps of the method for achieving compliance with HTTP adaptive streaming with a 2 steps watermarking technique according to a particular embodiment. In a first step 401, candidate locations for watermarking are obtained for the Q versions of the content for instance by analyzing each one of the Q versions of the content to identify candidate watermark embedding locations as well as the alternate value that could be used. The profiler generates Q potential embedding metadata comprising, for each candidate watermark embedding locations, the offsets, zero value, one value, and associated payload bit number.

In a second step 402, the harmonization module analyses jointly the Q embedding metadata to determine a watermark insertion rate calibrated on the minimum path, that is to say the path that concatenates, for all sets of temporally aligned chunks, the chunks with the smallest number of candidate locations. In the description, the term candidate locations and embedding changes are indifferently used.

In the first embodiment, determining the watermark insertion rate comprises computing the number of embedding changes for all chunks along the minimum path. According to a variant of this first embodiment, the second step 402 comprises counting the number of candidate locations for each chunk of each version of the content; determining for each set of temporally aligned chunks, the chunk with the smallest number of candidate location; determining the minimum path by concatenating the chunks with the minimum number of candidate locations for all sets of temporally aligned chunks; and computing the number of candidate locations for all chunks along the minimum path.

In the second embodiment, determining the watermark insertion rate comprises recording the payload truncation indices for all chunks along the minimum path assuming a reference spreading length $L_{ref}$ to guarantee a minimum level of robustness; and exporting the truncation point in the others chunks of the set. According to a variant of this second embodiment, the second step 402 comprises counting the number of candidate locations for each chunk of each version of the content; determining for each set of temporally aligned chunks, the chunk with the smallest number of candidate location to determine the minimum path and assuming a reference spreading length to be used along the minimum path, recording a payload truncation point each time a counter counting embedding changes on the minimum path reaches the reference spreading length and exporting the truncation point in the others chunks of the set. For each chunk, such truncation point corresponds to a switch to another bit in the payload.

In a third step 403, the harmonization module modifies the watermark embedding metadata for all Q qualities based on the watermark insertion rate resulting in new generated watermark embedding metadata.

In the first embodiment, modifying watermark embedding metadata comprises, for each chunk of a collection of temporally aligned chunks, discarding candidate embedding locations to match the number of embedding changes in the chunk associated to the minimum path.

In the second embodiment, modifying watermark embedding metadata comprises, for each chunk of a set of temporally aligned chunks, adjusting the spreading length to obtain the same payload truncation indices as the one recorded in the chunk associated to the minimum path.

In a fourth step 404, the payload is embedded by applying the modified watermark embedding metadata to the content.

In a first variant, this step 404 can be performed on the HTTP server side when receiving the client identification. Since, the Q versions of the content are already pre-processed; such solution advantageously requires less processing power and time than prior solutions. The HTTP server may comprise a watermark pre-processor adapted to perform the disclosed method. However, such watermark pre-processor is advantageously placed outside and ahead of the HTTP server, which only performs the embedding operation on demand using watermark embedding metadata produced offline.

In a second variant, the watermark embedding step 404 can be performed on the client side. Accordingly, the method further comprises a step of forwarding the watermark embedding metadata corresponding to the chunks requested by the client, and embedding the unique identifier assigned to the client. Advantageously, the watermark embedding metadata is compliant with any client watermark embedding device, that is to say the client watermark embedding device does not require particular characteristic dedicated to the watermark pre-processing method compliant with HTTP adaptive streaming.

Figure 5:
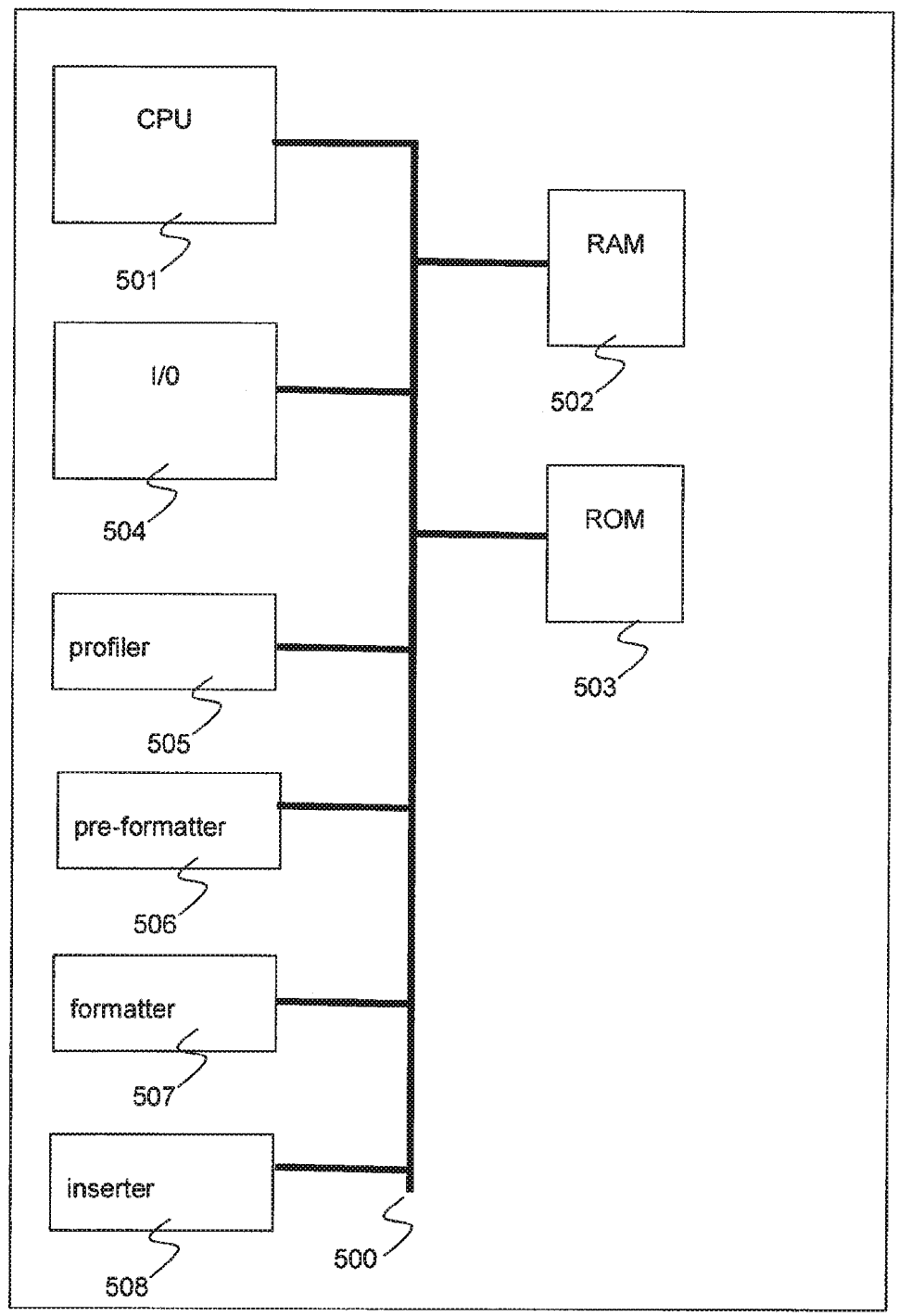
FIG. 5 illustrates a device implementing the method according to a particular embodiment.

FIG. 5 illustrates a hardware embodiment of a device 500 adapted to implement the steps of the method. The skilled person will also appreciate that the method can be implemented quite easily without the need for special equipment by devices such as PCs. According to different variants, features described for the method are being implemented in software module or in hardware module 505, 506, 507, 508. The device 500 comprises physical means intended to implement an embodiment of the invention, for instance a processor 501 (CPU), a data memory 502 (RAM or HDD), a program memory 503 (ROM), one of several inputs/outputs 504 (I/O).

When powered up, the microprocessor 501 loads and runs the instructions of the watermark pre-processing algorithm comprised in RAM 502, then the microprocessor 501 is configured to control functional modules. The memory RAM 502 further comprises the Q compressed bit streams representative of a content. A baseline watermarking device 500 comprises 3 elementary functional modules (neglecting the forensics side).

It comprises a profiler 505 that obtains candidate locations for watermarking for the Q versions of the content for instance by analyzing the input bit stream and outputs watermark embedding metadata (WEM), consisting of a list of offsets and potential values to guide the watermarking process and watermark forensics metadata (WFM) to perform detection.

It comprises a formatter 507 that re-organizes the information in the WEM and WFM to account for the spreading sequence and the error correction strategy set in place.

It comprises an inserter 508 which can then be used to interlace the WEM within the HAS master e.g. through the use of proprietary H.264 SEI NALU. In a variant, the WEM are delivered through the use of a file. Therefore a client-embedding module is able to perform the instructions given in the WEM to embed the payload. In another embodiment, the inserter 508 is adapted to perform the instructions given in the WEM to embed the payload.

According to a preferred embodiment, the watermarking device 500 further comprises a pre-formatter module 506 that takes in input the Q WEM files associated to the Q bit streams that the HAS master is made of, as well as the segmentation information of the HAS master i.e. the location of the boundaries of the temporally aligned chunks.

The pre-formatter then analyzes the Q WEM files chunk by chunk to derive some HAS-compliant statistics. In other words, for each chunk, it looks at the corresponding WEM for the Q qualities or versions and derives a meaningful statistics, e.g. the minimum number of changes per chunk.

A formatter 507 is then run for each one of the Q bit streams that the HAS master is made of. It takes in input the corresponding WEM and WFM files as well as the statistics computed by the pre-formatter 506. The latter is used to influence the behavior of the formatter 507.

In the first embodiment, for each collection of temporally aligned chunks, the pre-formatter 506 identifies the chunk with the minimum number of possible embedding changes. For each chunk, the formatter 507 then discards potential changes to match, for all qualities, the minimum recorded by the pre-formatter. In other words, for a given collection of temporally aligned chunks, all Q qualities share the same number of embedding changes, as depicted in FIG. 2.

In the second embodiment, the pre-formatter 506 records the payload truncation points along the minimum path, with a payload modulation strategy that uses a fixed reference spreading length. For each chunk in a collection of temporally aligned chunks, the formatter 507 adjusts the spreading length in order to match the payload truncation indices recorded by the pre-formatter. In other words, the payload truncation points are exported across all qualities and the same ratio of symbols are present in all chunks of a collection of temporally aligned chunks, as depicted in FIG. 3.

As will be appreciated by one skilled in the art, aspects of the present principles can be embodied as a system, method or computer readable medium. Accordingly, aspects of the present principles can take the form of an entirely hardware embodiment, an entirely software embodiment (including firmware, resident software, micro-code, and so forth), or an embodiment combining software and hardware aspects that can all generally be referred to herein as a "circuit," "module", or "system." Furthermore, aspects of the present principles can take the form of a computer readable storage medium. Any combination of one or more computer readable storage medium(s) may be utilized.

Naturally, the invention is not limited to the embodiments and characteristics previously described.

In particular, the invention is compatible with any watermark scheme in the compressed domain.

The invention claimed is:

1. A method for preparing content for watermarking, said content being available in different versions on a server for adaptive streaming delivery to at least a client, wherein said different versions of the content are subdivided into temporally aligned chunks and a unique identifier representative of the client is designed to be inserted in the chunks requested by said client by watermark embedding, the method comprising:
obtaining, by the server, for each version and each chunk of the content, candidate embedding changes for watermarking at different locations within the chunk;
analyzing jointly, by the server, the candidate embedding changes of the different versions of the content to determine a watermark payload bit insertion rate for each set of temporally aligned chunks according to a minimum path, wherein said minimum path comprises, for all sets of temporally aligned chunks, the chunks with the smallest number of candidate embedding changes, and wherein determining the watermark payload bit insertion rate comprises determining payload truncation points, wherein a truncation point is representative of a switch to another bit in the payload along the minimum path, and exporting the truncation points in other chunks of the set of temporally aligned chunks;
generating, by the server, for each version and each chunk of the content, metadata for watermark embedding by adopting a spreading length per chunk that yields said payload truncation points, such that the watermark payload bit insertion rate for said version and said chunk of the content is equal to the watermark payload bit insertion rate according to the minimum path;
storing the metadata for each version and each chunk of the content on a non-transitory computer-readable medium; and
forwarding the chunks requested by the client without being modified by watermarking, along with the metadata corresponding to the chunks requested by the client through an input/output of the server.

2. A non-transitory program storage device, readable by a computer, tangibly embodying a program of instructions executable by the computer of a server to perform a method, wherein content is available in different versions on the server for adaptive streaming delivery to at least a client, said different versions of the content being subdivided into temporally aligned chunks and a unique identifier representative of the client is designed to be inserted in the chunks requested by said client by watermark embedding, the method comprising the following acts performed by the server:
obtaining, for each version and each chunk of the content, candidate embedding changes for watermarking at different locations within the chunk;
analyzing jointly the candidate embedding changes of the different versions of the content to determine a watermark payload bit insertion rate for each set of temporally aligned chunks according to a minimum path, wherein said minimum path comprises, for all sets of temporally aligned chunks, the chunks with the smallest number of candidate embedding changes, and wherein determining the watermark payload bit insertion rate comprises determining payload truncation points, wherein a truncation point is representative of a switch to another bit in the payload along the minimum path, and exporting the truncation points in other chunks of the set of temporally aligned chunks;
generating, for each version and each chunk of the content, metadata for watermark embedding by adopting a spreading length per chunk that yields said payload truncation points, such that the watermark payload bit insertion rate for said version and said chink of the content is equal to the watermark payload bit insertion rate according to the minimum path;
storing the metadata for each version and each chunk of the content on a non-transitory computer-readable medium; and
forwarding the chunks requested by the client without being modified by watermarking, along with the metadata corresponding to the chunks requested by the client through an input/output of the server.

3. A device for preparing content for watermarking, wherein said content is available in different versions for adaptive streaming delivery to at least a client, said different versions of the content being subdivided into temporally aligned chunks and a unique identifier representative of the client is designed to be inserted in the chunks requested by said client by watermark embedding, the device comprising:
an input/output;
a non-transitory computer-readable memory;
a processor configured to:
obtain, for each version and each chunk of the content, candidate embedding changes for watermarking at different locations within the chunk;
analyze jointly the candidate embedding changes of the different versions of the content to determine a watermark payload bit insertion rate for each set of temporally aligned chunks according to a minimum path, wherein said minimum path comprises, for all sets of temporally aligned chunks, the chunks with the smallest number of candidate embedding changes, and wherein determining the watermark payload bit insertion rate comprises determining payload truncation points, wherein a truncation point is representative of a switch to another bit in the payload along the minimum path, and exporting the truncation points in other chunks of the set of temporally aligned chunks;
generate, for each version and each chunk of the content, metadata for watermark embedding by adopting a spreading length per chunk that yields said payload truncation points, such that the watermark payload bit insertion rate for said version and said chunk of the content is equal to the watermark payload bit insertion rate according to the minimum path;
store the metadata for each version and each chunk of the content on the non-transitory computer-readable memory; and
forwarding the chunks requested by the client without being modified by watermarking, along with the stored metadata corresponding to the chunks requested by the client through the input/output of the device.

* * * * *